(12) United States Patent
Hayashi et al.

(10) Patent No.: US 7,695,588 B2
(45) Date of Patent: Apr. 13, 2010

(54) MATRIX RESIN COMPOSITION FOR FIBER-REINFORCED PLASTICS AND PROCESS FOR PRODUCTION OF FIBER-REINFORCED PLASTICS

(75) Inventors: Noriya Hayashi, Aichi (JP); Shunichi Hayashi, Aichi (JP); Norio Miwa, Aichi (JP); Toshikatsu Nohara, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 357 days.

(21) Appl. No.: 10/492,940

(22) PCT Filed: Oct. 31, 2002

(86) PCT No.: PCT/JP02/11344

§ 371 (c)(1),
(2), (4) Date: Sep. 27, 2004

(87) PCT Pub. No.: WO03/037950

PCT Pub. Date: May 8, 2003

(65) Prior Publication Data

US 2005/0072522 A1 Apr. 7, 2005

(30) Foreign Application Priority Data

Oct. 31, 2001 (JP) ............... 2001-333973

(51) Int. Cl.
*B32B 37/00* (2006.01)
(52) U.S. Cl. ............... 156/307.1; 156/331.7; 525/453; 428/292.1
(58) Field of Classification Search ............ 156/307.1, 156/307.3, 307.4, 307.7, 331.7; 525/453; 428/292.1, 299.1
See application file for complete search history.

(56) References Cited

U.S. PATENT DOCUMENTS

| | | | | |
|---|---|---|---|---|
| 3,395,114 A | * | 7/1968 | Smith | 524/342 |
| 3,620,680 A | * | 11/1971 | Bartel et al. | 422/138 |
| 3,644,457 A | * | 2/1972 | Konig et al. | 560/351 |
| 4,166,889 A | * | 9/1979 | Fujii et al. | 428/90 |
| 4,540,781 A | * | 9/1985 | Barsa | 544/193 |
| 4,738,999 A | | 4/1988 | Blenner et al. | |
| 5,071,613 A | * | 12/1991 | Fukami et al. | 264/257 |
| 6,423,810 B1 | * | 7/2002 | Huang et al. | 528/77 |

FOREIGN PATENT DOCUMENTS

| | | |
|---|---|---|
| EP | 0016248 | 10/1980 |
| EP | 0 361 419 A2 | 4/1990 |
| EP | 0 367 014 A2 | 5/1990 |
| GB | 919500 | 2/1963 |
| JP | 62-232440 | 10/1987 |
| JP | 01210413 A * | 8/1989 |
| JP | 2-92914 | 4/1990 |
| JP | 2-107431 | 4/1990 |
| JP | 05-125147 | 5/1993 |

OTHER PUBLICATIONS

Abstract for JP 01210413.*

* cited by examiner

Primary Examiner—John L Goff
(74) Attorney, Agent, or Firm—Oblon, Spivak, McClelland, Maier & Neustadt, L.L.P.

(57) ABSTRACT

Provided are a matrix resin composition for fiber reinforced plastic, which comprises a bifunctional or trifunctional liquid diisocyanate, a bifunctional polyol and a bifunctional chain extender containing an active hydrogen group, with a molar ratio of the functional groups of the diisocyanate, polyol and chain extender of 5.0 to 1.0:1.0:4.0 to 0, respectively; and a process for producing fiber reinforced plastic, which comprises impregnating a fibrous material with the resin composition and then curing. The present invention makes it possible to produce a molding containing fibers densely, having excellent strength and inflatability, in the production of an FRP molding by using a thermosetting resin having an extended pot life.

18 Claims, No Drawings

MATRIX RESIN COMPOSITION FOR FIBER-REINFORCED PLASTICS AND PROCESS FOR PRODUCTION OF FIBER-REINFORCED PLASTICS

TECHNICAL FIELD

The present invention relates to a matrix resin composition for fiber reinforced plastic and a process for producing fiber reinforced plastic, particularly to a process for producing a fiber reinforced plastic plate or cylinder having inflatability by using fiber reinforced plastic (FRP) or carbon fiber reinforced plastic (CFRP; which may hereinafter be included in "FRP").

BACKGROUND ART

In order to send materials into space to fabricate a structure, the volume of each material must be kept as small as possible for transportation. For example, a large apparatus such as a panel for a solar cell to be installed on a satellite or space structure is required to be reduced in size when transporting from the Earth. An apparatus folded when transporting is expanded into a predetermined shape suitable for use in space such as on a satellite orbit. The property of a material which permits shrinking for transport and expansion or deployment into a predetermined shape upon practical use is called "inflatability".

Inflatability is also an important property for materials used for ground-based structures. Use of an inflatable material enables compact storage (volume reduction) when loading on a delivery vehicle or the like and expansion into a predetermined shape upon use at a fabrication or building site.

Structures having inflatability can be classified into two categories: structures which make use of mechanical action such as folding at joints, and those which make use of action derived from a material property, that is, restoration into the original shape by heating.

Conventional inflatability tended to result from mechanical actions and folding at a joint part is often used. Upon use, therefore, some power has to be applied to the joint part to expand the structure into a predetermined shape. Such a structure has the drawback that problems such as breakdowns or accidents may occur upon expansion.

Several studies have so far been made on structures having inflatability which depends on the action of a material property. When used to construct a large-sized structure, a material having inflatability must have certain strength by having it go through a process of making it more rigid. Preferred examples of a polymer material which can be rigidified and provide sufficient strength include fiber reinforced plastic (FRP) and carbon fiber reinforced plastic (CFRP). In order to let FRP have inflatability, fibrous material may be insided in a shape memory polymer material.

The term "shape memory polymer" as used herein means, among conventional polymers, a resin whose molded shape and deformed shape can be used selectively by temperature operation with heat. A molded product of a shape memory polymer using such a resin is deformed at a glass transition point of the polymer or above but at a temperature less than a molding temperature, and then cooling it to the glass transition point (Tg) or below while keeping the deformed shape, thereby fixing the deformed shape; and restoring the molded shape by heating it at a temperature of the glass transition point or above but at a temperature less than the molding temperature. Thus, the deformed and molded shapes can be used selectively by temperature operation.

The term "FRP" generally means fiber reinforced plastic containing a continuous fibrous material. It has hardness comparable to ceramic and strength comparable to a metal. It weighs about one fifth of iron, but has a modulus of elasticity about 3 to 4 times superior to that of iron. It has been an important theme to find how dense fibers and resin can be packed in FRP, particularly CFRP, per unit cross-sectional area thereof.

The proportion of fibers determines the strength of FRP. With an increase in the proportion of fibers, the strength of FRP increases. Upon molding such FRP into a plate or the like, resin is necessary for the purpose of fiber-to-fiber adhesion. There are various weaving or twisting types of these fibers used for FRP. For example, a cloth having even a width of about 10 m is usable and it is suitable for use in a plate or pipe of large-sized structures.

When such FRP is produced, a fibrous material must be immersed with a resin. The material can be immersed better with a thermosetting resin than with a thermoplastic resin. Since the thermosetting resin usually has a low viscosity, it enables production of fine FRP and the resulting FRP is capable of maintaining high strength. The thermoplastic resin on the other hand softens easily, leading to a difficulty in retaining the structure of FRP.

However, use of a thermosetting resin having a shape memory property for the production of FRP has conventionally involved the drawback that a two-part curable resin, for example, cures immediately after mixing and time (pot life) necessary for operation such as impregnation cannot be secured.

DISCLOSURE OF THE INVENTION

In view of the above-described problems, the present inventors have carried out extensive investigation in order to develop a thermosetting resin having an extended pot life and shape memory property and at the same time to develop a process for producing an FRP molding which contains fibers densely, thereby having excellent strength and properties such as inflatability.

As a result, the present inventors have found that the above-described problems can be overcome by fiber reinforced plastic obtainable by impregnating a fibrous material in a shape memory polymer having a specific polyol component. The present invention has been completed based on such a finding.

In the present invention, there is thus provided a matrix resin composition for fiber reinforced plastic, which comprises a bifunctional or trifunctional liquid diisocyanate, a bifunctional polyol and a bifunctional chain extender containing an active hydrogen group, with a molar ratio of the functional groups of the diisocyanate, polyol and chain extender of 5.0 to 1.0:1.0:4.0 to 0, respectively.

In the present invention, there is also provided a production process of fiber reinforced plastic, which comprises impregnating a fibrous material with a matrix resin composition prepared using a bifunctional or trifunctional liquid diisocyanate, a bifunctional polyol and a bifunctional chain extender containing an active hydrogen group, with a molar ratio of the functional groups of the diisocyanate, polyol and chain extender of 5.0 to 1.0:1.0:4.0 to 0, respectively, and then curing.

The above-described polyol contains polypropylene glycol usually in an amount of 50 wt. % or greater, preferably 70 wt. % or greater. As another polyol component to be added to the resin composition, an aromatic or aliphatic side-chain system which is an ether system free of hydrolysis and is able to have increased Tg is preferred from the viewpoint of molecular design.

In the present invention, there is also provided a process for producing fiber reinforced plastic, which comprises stacking at least two layers of a fibrous material after the above-described impregnation, applying pressure thereon to adhere them to each other and curing as a laminate having a multi-layer structure.

Since the FRP of the present invention is fixed under compression by a resin composition which is a shape memory polymer while having a fibrous material in the FRP, it has inflatability and can be deformed into a second shape by heating. By properly using at least two such shapes and physical properties of these shapes, the FRP of the present invention can be used for various applications. Particularly when the glass transition point of the polymer is set at about room temperature, FRP can be deformed and fixed, deployed or expanded easily at any time by simple heating means.

A description will next be made of a resin composition used for fiber reinforced plastic of the present invention and also a production process of the fiber reinforced plastic.

BEST MODE FOR CARRYING OUT THE INVENTION

The fiber reinforced plastic of the present invention is obtained by impregnating a fibrous material with a matrix resin composition prepared using a bifunctional or trifunctional liquid diisocyanate, a bifunctional polyol and a bifunctional chain extender containing an active hydrogen group, with a molar ratio of the functional groups of the diisocyanate, polyol and chain extender of 5.0 to 1.0:1.0:4.0 to 0, respectively, and then curing.

First, the matrix resin composition for fiber reinforced plastic of the present invention will be described. In the resin composition of the present invention, a mixed ratio expressed as a molar ratio of the functional groups is usually, diisocyanate:polyol:chain extender=5.0 to 1.0:1.0:4.0 to 0, preferably diisocyanate:polyol:chain extender=3.0 to 1.2:1.0:2.0 to 0.2, more preferably diisocyanate:polyol:chain extender=2.0 to 1.3:1.0:1.0 to 0.3.

The resin composition of the present invention is required to have an initial impregnation ability in order to allow it to penetrate into the fibrous material sufficiently and at the same time, have at least a certain period of pot life.

The viscosity of the resin composition, as a result of measurement of viscoelasticity, is preferably 1000 cps or less when impregnation ability into the reinforcing fibers is taken into consideration.

The pot life is preferably 30 minutes or more, more preferably 60 minutes or more in order to secure a sufficient impregnation time of the fibrous material with the resin composition and obtain a high-density FRP molding. The term "pot life" as used herein means a time required for the viscosity of the resin composition to reach, for example, 1000 cps.

For the exhibition of an inflatable function, a memory shape property must be retained and for this purpose, the resin composition is usually desired to have a Tg of from 50 to 70° C., preferably from about 55 to 60° C.

Raw materials usable for the resin composition of the present invention will next be described, but not limited thereto.

As bifunctional isocyanates, there exist those represented by the formula OCN-R-NCO in which R has one or two benzene rings, and those represented by the same formula in which R has no benzene ring. Any one is usable. Specific examples include 2,4-triene diisocyanate, 4,4'-diphenyl-methane diisocyanate, carbodiimide-modified 4,4'-diphenyl-methane diisocyanate and hexamethylene diisocyanate.

Examples of the bifunctional polyol include those represented by the formula HO-R'-OH in which R' has 1 or 2 benzene rings, or R has no benzene ring, and products obtained by reacting the above-described bifunctional polyol with a bifunctional carboxylic acid or cyclic ether. Specific examples include polypropylene glycol, 1,4-butaneglycol adipate, polytetramethylene glycol, polyethylene glycol and bisphenol-A+propylene oxide.

In the present invention, among the above-described polyols, ether systems which are free from hydrolysis and at the same time, are aromatic or aliphatic side-chain systems whose Tg can be increased from the viewpoint of their molecular design are preferred. Particularly, among the above-described compounds, polypropylene glycol is preferred, preferably with the monomer in the polyol component in an amount of 50 wt. % or greater, more preferably 70 wt. % or greater, still more preferably 90 wt. % greater.

Although no particular limitation is imposed on the molecular weight of the polyol, a polyol having a molecular weight of 1000 or less, more preferably 650 or less is preferred. A polyol having an excessively high molecular weight is not preferred, because it lowers the Tg of the resulting resin composition.

As the bifunctional chain extender containing an active hydrogen group, those represented by the formula HO-R"-OH in which R" represents a $(CH_2)_n$, a group having 1 or 2 benzene rings and the like are usable. Specific examples include ethylene glycol, 1,4-butaneglycol, bis(2-hydroxyethyl)hydroquinone, bisphenol-A+ethylene oxide, and bisphenol-A+propylene oxide. Such a chain extender plays a role as a Tg regulator in the resin composition. In particular, it serves to maintain a high Tg.

To the resin composition, at least one ordinarily employed additive which does not disturb curing can be added and examples include various fillers, organic components and reactive diluents.

The fibrous material is not limited to fibers made of an organic material, but inorganic fibers such as glass fibers, and carbon fibers are usable. More specifically, carbon fibers and aramide fibers are suitable. The weave is not limited and, for example, a plain weave fabric made of warp and weft threads is usable. The fabric having a thickness, for example, ranging from 0.1 to 1.0 mm can be used.

The fiber reinforced plastic of the present invention may contain, in addition to the above-described matrix resin composition and fibrous material, strengthening fibers and colorants. Their proportion is not particularly limited.

Although there is no particular limitation imposed on the composition ratio of the fiber reinforced plastic obtainable by the production process of the present invention, the volume content of the fibrous material preferably ranges from 10 to 70 vol. %, more preferably from 20 to 60 vol. %, and still more preferably from 20 to 55 vol. %. The theoretical volume of the fibrous material in the FRP can be calculated by dividing the weight of the fibrous material per unit area by the density of the fibrous material while taking the number of the stacked layers of the fibrous material into consideration. A volume content of the fibrous material less than 10 vol. % is not preferred, because the fibrous material cannot play its role in reinforcement fully. A volume content of the fibrous material exceeding 70 vol. %, on the other hand, impairs moldability and prevents sufficient impregnation with the resin, making it difficult to obtain a non-defective product. In addition, when the volume content of the fibrous material exceeds 60 vol. %, the resin composition cannot exhibit inflatability fully. Within the above-described range of the volume content, the greater the composition ratio of the fibrous material, the higher the strength of the resulting molded product. The greater the resin content, on the other hand, enables rapid deployment or restoration upon heating of the molded product.

One example of the production process of the fiber reinforced plastic of the present invention will next be described, but the present invention is not limited to or by it. Various molding processes can be adopted for the FRP production.

The resin composition of the present invention may be prepared by putting the materials into a resin tank and then mixing; or putting materials, which have been prepared in advance in respective containers, in a resin tank. The above-described fibrous material is then put in the resin tank for impregnation. Impregnation time can be determined freely, depending on the composition of the resin or the kind of the fibrous material. The resin composition of the present invention has a pot life of 30 minutes or more so that impregnation is conducted for a period of time permitting sufficient penetration of the resin in the fibers within this pot life.

It is preferred that in the curing step of FRP after impregnation, temperature is increased gradually under a considerable pressure while giving a complete shape to the fiber and resin. This is because a drastic increase in the temperature happens to disturb dense filling of the fibers and to produce only a crude FRP molding.

For the manufacture of a high-density FRP, a deliberate temperature control such as a control which gradually increases temperature is desirable.

As another impregnation method of the fibrous material, the material may be taken as a cloth, mat, tape or the like and then directed through the resin tank filled with the resin composition. In addition to the impregnation in the resin tank, a method of spraying downward or upward with the resin composition can also be adopted as needed.

In order to obtain, by molding, a laminate having a multilayer structure, at least two layers of the fibrous material impregnated with the resin composition are stacked upstream of the pressing step to adhere them to each other. After the thickness of the overlapped layers is adjusted, the resulting plural layers of the fibrous material such as cloth are directed to a pressuring mechanism and cured. If necessary, a plurality of curing processes can be carried out successively.

Upon curing, the heat pressing temperature is usually raised to 60 to 180° C., while the pressure is usually set at about 0 to 20 kgf/mm².

In order to control the temperature and remove a strain due to heat, post curing can be conducted. At this time, the heat applied to the cured fibrous material is preferably higher than that applied upon molding. After a cutting step, the molded product thus obtained is inspected to complete the production process.

In the present invention, it is possible to sufficiently impregnate the fibrous material with the resin upon FRP production, because use of the matrix resin composition enables securing of initial impregnation ability and a predetermined length of pot life. This makes it possible to easily produce a FRP molding having a sufficient strength and inflatability. The FRP thus obtained can therefore be deformed into a predetermined shape and by a simple heating operation, the original molded shape can be restored.

Modes for carrying out the present invention were described above. However, the present invention is not limited thereto and can be modified or changed within an extent not departing from the gist of the present invention. The present invention will next be described in further detail by Examples. It should however be borne in mind that the present invention is not limited to or by them.

EXAMPLES

Example 1

The layer constitution of FRP is a factor influenced by the physical properties of the FRP and it differs, depending on the requirements of the structure to which it is used.

For inflatable FRP, it is important to have inflatability in addition to the fundamental physical properties of FRP. Properties of the resin and properties of the fibrous material, and in addition thereto, the proportion of resin content, thickness of FRP, orientation of the fibers, and FRP layer constitution have a large influence on the inflatability. Accordingly, FRP was obtained by using an ordinarily used carbon fiber cloth (CF cloth) and a two-part curable shape-memory polymer, and molding by thermal press for studying influences of the number of the layers of CF cloth and FRP thickness on inflatability. The results are shown below in Table 1.

TABLE 1

| Plate thickness | CF cloth, one layer | CF cloth, two layers | CF cloth, three layers |
|---|---|---|---|
| 0.5 mm | Inflatable | Inflatable | Inflatable |
| 1.0 mm | — | Inflatable | Inflatable |
| 1.5 mm | — | — | Inflatable |

Note)
CF cloth: "PYROFIL TR 1120M" (product of Mitsubishi Rayon Co., Ltd.), plain weave fabric, thickness: 0.17 mm From Table 1, it may be understood that the FRP had inflatability in any case where the thickness of FRP was set at 0.5 mm, 1.0 mm and 1.5 mm and where the number of the CF clothes stacked was 1, 2 and 3.

Example 2

A two-part curable polyurethane resin usable as the resin composition of the present invention is composed of an NCO-containing isocyanate, an OH-containing polyol (long chain) and a chain extender (short chain).

Monomers for the two-part curable resin must be in the liquid form at normal temperature. In addition to this requirement, the control of Tg, reactivity and the like must be taken into consideration. In the present invention, it is necessary to study the polyol component, which serves as a curing agent among the above-described components, in order to attain a sufficient pot life while securing initial impregnation property of the resin composition.

A propylene oxide adduct (BPXB800) of bifunctional bisphenol A, bifunctional polyethylene glycol (PEG300) and bifunctional polypropylene glycol (PPG400) were employed singly as the aromatic compound, aliphatic compound and aliphatic side-chain compound, respectively in order to compare therewith an aliphatic ester compound (Polycaprolactonediol: "PCL500") for measuring the Tg and dynamic viscoelasticity after curing. The results of the Tg of the cured products are shown in Table 2.

TABLE 2

| Polyol monomer | Tg (° C.) |
|---|---|
| PPG400 | 42.8 |
| PEG300 | 38.4 |
| BPX800 | 35.2 |
| PCL500 | 15.7 |

It was confirmed that compared with the ester compound (PCL500), the Tg of the other compounds was higher.

The results of measuring the viscoelasticity show the above-described compounds all underwent a large change in a modulus of elasticity (Pa) within a range of from 30 to 50° C.

Next, with regards to the above-described four types of polyol monomer, a time-dependent change of the solution viscosity after two parts were mixed was measured at 25° C. in the scale of 200 g.

As a result, the aliphatic PCL500 and PEG 300 showed a high reactivity and their solution viscosity increased rapidly. Compared therewith, the aliphatic side-chain PPG400 and aromatic BPX800 showed a low reactivity and owing to a slow increasing rate of their solution viscosity, almost no change was observed within about 30 minutes. The aliphatic side chain PPG400 and the aromatic BPX800 maintained low viscosity for about 150 minutes and for about 50 to 60 minutes, respectively. The impregnation property of the aromatic BPS800 to the CF cloth was however presumed to be poor judging from its high initial viscosity.

With regards to, among the above-described polyol monomers, the bifunctional polypropylene glycol (PPG400) which is an aliphatic side-chain compound having good initial impregnation property in the fibrous material and having a pot life of at least a predetermined length, the effect of a chain extender on an increase of Tg was tested.

As the chain extender, 1,4-butane glycol was employed and fluctuations in Tg were measured as the proportion introduced changed. The results are shown below in Table 3.

TABLE 3

| Molar ratio | Tg (° C.) |
|---|---|
| PPG400 | 42.8 |
| PPG400/1,4BG = 1/0.5 | 57.3 |
| PPG400/1,4BG = 1/1 | 63.6 |

From the above-described results, it has been confirmed that an increase in Tg of the resin composition was actualized by using 1,4-butanediol when the bifunctional polypropylene which is an aliphatic side-chain compound was used as a polyol.

Example 3

In this Example, the FRP of the present invention was produced and evaluated.

A resin composition was prepared in the below-described composition ratio by using carbodiimide-modified 4.4°-diphenylmethane diisocyanate (MDI) in the liquid form, a bifunctional polypropylene glycol (PPG400) which is an aliphatic side-chain compound, and 1,4-butaneglycol (1,4BG) were used as the isocyanate component, polyol component and chain extender, respectively:

MDI/PPG400/1,4BG=1.55/1.00/0.50 (Molar ratio of functional groups)=117.7/100/11.25 (weight ratio)

The isocyanate component (main agent) and polyol component (curing agent) are reacted to cause curing, whereby the composition becomes a resin.

As the fibrous material, a sample (1TP) made of one piece of a carbon fiber cloth (CF cloth) and another sample (2TP) made of two pieces of a CF cloth were prepared.

The FRP was manufactured by the hot pressing method.

First, the CF cloth was cut into a piece and it was placed in a spacer having a thickness of about 1 mm.

The main agent and curing agent of the resin composition were subjected to vacuum deaeration at 60° C. for about 2 hours, followed by cooling to room temperature. Then, the isocyanate component (MDI), polyol component (PPG400) and chain extender (1,4BG) were mixed at a weight ratio of 97/103/10 under stirring. The turbid mixture became transparent by stirring for about 2 minutes.

The transparent resin component was cast on the CF cloth. After it was covered with a PET film, the resin was impregnated in the cloth and bubbles were pushed out by using a rubber roll. The cloth impregnated with the resin component was sandwiched between aluminum plates and they were pressed at about 1 kgf/mm$^2$ at 70° C. for about 2 hours.

After cooling to room temperature while applying a pressure, the resulting cloth was removed from the mold and cut into a predetermined size.

With regards to the FRP thus obtained, the modulus of elasticity showed about a twenty- to forty-fold change with Tg (328K) as a boundary, suggesting that it can be fixed sufficiently after deformation. A change in the modulus of elasticity of the resin composition itself was 300-fold or greater.

Next, the shape fixation and shape restoration of this FRP were evaluated. Immediately after a test piece of this FRP was immersed in hot water of 358K (Tg+30K) for about 30 seconds, it was fitted completely to a jig heated to 358K in a temperature controlled bath.

The jig and sample were taken out from the hot water. After immersion in water of 298K (Tg−30K) for 5 minutes, they were taken out therefrom. The sample was removed from the jig and allowed to stand for 30 seconds. Then, the shape of the sample was traced.

It was then immersed in hot water of 358K for 30 seconds, taken out from the hot water, and allowed to stand for 30 seconds. The shape of the sample was traced.

As a result, it was found that both 1TP and 2TP showed good results, more specifically, exhibited the shape fixation of 99% or greater and shape restoration of about 100%.

The invention claimed is:

1. A thermosetting matrix resin composition for fiber reinforced plastic, comprising:
    resin matrix components consisting essentially of carbodiimide modified 4,4'-diphenylmethane diisocyanate;
    bifunctional polyol comprising polypropylene glycol in an amount of 50 wt.% or greater; and
    a bifunctional chain extender containing an active hydrogen group;
    wherein
    each of the carbodiimide modified 4,4'-diphenylmethane diisocyanate, bifunctional polyol and bifunctional chain extender is a liquid at normal temperature;
    upon mixing of the carbodiimide modified 4,4'-diphenylmethane diisocyanate with the bifunctional polyol and bifunctional chain extender at 25° C. in a scale of 200g, a solution viscosity remains unchanged for at least 30 minutes;

a molar ratio of the functional groups of the carbodiimide modified 4,4'-diphenylmethane diisocyanate, polyol and chain extender is 5.0 to 1.0: 1.0 : 4.0 to greater than 0, respectively; and the thermosetting matrix resin composition has a Tg of from 50 to 70° C.

2. A process for producing an inflatable fiber reinforced plastic, comprising:

impregnating a fibrous material with the thermosetting matrix resin composition as claimed in claim 1; and then curing, thereby forming an inflatable fiber reinforced thermosetting resin.

3. The process for producing an inflatable fiber reinforced plastic according to claim 2, wherein a molecular weight of the polypropylene glycol comprised in the bifunctional polyol in an amount of 50 wt.% or greater is approximately 400.

4. The process for producing an inflatable fiber reinforced plastic according to claim 3, further comprising, after impregnating the fibrous material, stacking at least two layers of the impregnated fibrous material to adhere to each other, applying a pressure thereon, and curing into a laminate having a multi-layer structure.

5. The thermosetting matrix resin composition according to claim 1, wherein the molar ratio of the functional groups of the carbodiimide modified 4,4'-diphenylmethane diisocyanate, polyol and chain extender is 3.0 to 1.2 :1.0: 2.0 to 0.2, respectively.

6. The thermosetting matrix resin composition according to claim 1, wherein the molar ratio of the functional groups of the carbodiimide modified 4,4'-diphenylmethane diisocyanate, polyol and chain extender is 2.0 to 1.3 :1.0: 1.0 to 0.3, respectively.

7. The thermosetting matrix resin composition according to claim 1, wherein the Tg is from 55 to 60° C.

8. The thermosetting matrix resin composition according to claim 1, wherein upon mixing of the carbodiimide modified 4,4'-diphenylmethane diisocyanate with the bifunctional polyol and bifunctional chain extender at 25° C. in a scale of 200g, a solution viscosity remains unchanged for at least 60 minutes.

9. The thermosetting matrix resin composition according to claim 1, wherein a molecular weight of the polypropylene glycol comprised in the bifunctional polyol in an amount of 50 wt.% or greater is approximately 400.

10. The thermosetting matrix resin composition according to claim 1, wherein the bifunctional polyol comprises polypropylene glycol in an amount of 70 wt.% or greater.

11. The thermosetting matrix resin composition according to claim 1, wherein the bifunctional polyol comprises polypropylene glycol in an amount of 90 wt.% or greater.

12. The process for producing an inflatable fiber reinforced plastic according to claim 2, wherein the bifunctional polyol comprises polypropylene glycol in an amount of 70 wt.% or greater.

13. The process for producing an inflatable fiber reinforced plastic according to claim 2, wherein the bifunctional polyol comprises polypropylene glycol in an amount of 90 wt.% or greater.

14. A composition comprising the matrix resin according to claim 1, and a fibrous material.

15. An inflatable fiber reinforced plastic made by the process according to claim 2.

16. The process for producing an inflatable fiber reinforced plastic according to claim 2, wherein the fibrous material is a carbon fiber.

17. The composition according to claim 14, wherein the fibrous material is carbon fiber.

18. The inflatable fiber reinforced plastic according to claim 15, wherein the fibrous material is carbon fiber.

* * * * *